Oct. 26, 1965 O. H. McCOY 3,214,644

TRIGGER CIRCUIT

Filed Sept. 24, 1962

OAKLEY H. McCOY
INVENTOR.

BY Allen M. Sutton
ATTORNEY

United States Patent Office 3,214,644

Patented Oct. 26, 1965

3,214,644

TRIGGER CIRCUIT

Oakley H. McCoy, Canoga Park, Calif., assignor, by mesne assignments, to The Bunker-Ramo Corporation, Stamford, Conn., a corporation of Delaware Filed Sept. 24, 1962, Ser. No. 225,492
11 Claims. (Cl. 317—148.5)

This invention relates to electrical trigger circuits. More particularly it relates to an improved trigger circuit which may have one or more electrically actuatable means connected in its output circuit and which is adapted to be changed from a first state to a second state for the duration of an input signal and to return to its first state upon cessation of the input signal.

As is well known, a trigger circuit is one in which an externally applied signal causes a virtually instantaneous change in the state of equilibrium of a circuit. Once the applied signal has initiated the change, the circuit uses its own power to complete the operation through regenerative action. Trigger circuits generally operate in the astable, monostable, or bistable modes of operation.

Astable circuits are free running circuits, the free running multivibrator being a typical example. Trigger pulses are used with this type of circuit for synchronization purposes only.

In the monostable mode of operation, the circuit is initially in a first or stable state of equilibrium. When it is triggered by an externally applied pulse, its state changes from the initial stable state to a second or unstable state. The time constant of the circuit elements holds the circuit in the second state for a period of time after which it moves back to its original stable state. An example of this type of circuit is the monostable multivibrator.

A bistable circuit is initially at rest in either one of two stable states. When triggered by an input pulse, the circuit switches from the first to the second stable state where it remains until triggered by another pulse whereupon it switches back to its first state. Examples of this type of circuit are the Eccles-Jordan bistable multivibrator and a direct coupled bistable multivibrator.

Another type of trigger circuit, which, strictly speaking, is neither a monostable circuit nor a bistable circuit, is known as a Schmitt trigger circuit. In the Schmitt circuit, application of an input signal of greater than a predetermined amplitude causes the circuit to switch from a first state to a second state. Theoretically, it remains in that second state until the input pulse amplitude has decreased below the predetermined level, at which time the circuit returns to its first state. The rise and fall time of the output wave of the Schmitt circuit is shorter than that of the conventional bistable multivibrator. Thus, it is quite popular for use involving switching arrangements. The present invention is directed toward an improvement in the Schmitt type of circuit having electrically actuatable means (such as a relay) connected in its output portion.

In many applications of electrical relays, it is desirable to use a relay of the so-called bipolar or latching relay type. Such a relay has two actuating coils which operate to hold the relay contacts positively in either one of two positions depending upon which coil is energized. This type of relay is particularly useful in applications involving severe environmental conditions, such as in a missile or space vehicle, where the relay is subjected to shock and vibration. In accordance with one aspect of the present invention, the actuating coils of a relay are connected into an improved Schmitt trigger circuit, whereby as the circuit changes from one state to another one relay coil is deenergized while the other is energized, thus providing positive action of the relay.

Environmental conditions which would make desirable the use of a latching relay rather than the more conventional spring-loaded type generally also impose severe temperature requirements. For example, in missile and space use, equipment may be required to withstand temperatures from as low as −55° C. to +85° C., and still operate within that wide temperature range with extreme reliability. Generally also, such applications require low power drainage and a minimum of weight. Therefore, because of their reliability and power and weight advantages, it is most desirable to use transistors in electronic circuitry wherever possible.

It has been found that a conventional transistorized Schmitt trigger circuit has a characteristic that limits its use under severe temperature conditions. As was previously noted, a Schmitt trigger circuit operates to change from a first state to a second state when an input signal exceeds a predetermined amplitude and to return to the first state when the input signal falls below the predetermined amplitude. In this case, the circuit is said to exhibit no "hysteresis" effect. It has been found, however, that as the ambient temperature in which the circuit operates decreases, the input signal level at which the circuit returns to its first state also decreases; that is, the Schmitt circuit exhibits hysteresis effect. For example, if the constants of the circuit are so adjusted that, when operating at a temperature of +60° C., it will be triggered to its second state by an input signal of, for example, five volts and will return to its first state if the input signal drops below that level, it has been found that if the temperature is reduced to approximately −40° C., the circuit will not return to its first state until the amplitude of the input signal has decreased far below the five volt level (to perhaps a three volt level) required at +60° C. In this case, an "ON-OFF" hysteresis gap of two volts prevails. This opens up the possibility that when the circuit is triggered by noise input signals in the absence of a desired input signal, the circuit may not return to its first state as quickly as is necessary when the noise signal level begins to subside. Thus, when actuatable means such as a relay is connected into a conventional Schmitt circuit, the relay becomes extremely sensitive to noise signals appearing at its input when it is operating at a low temperature. The present invention obviates this disadvantage of the conventional Schmitt trigger circuit.

Broadly speaking, the present invention is based on the fact that electrically actuatable devices generally have predetermined finite time constants, which cause delays between the start of actuating signals and actual actuation of the devices. A relay, for example, does not close as soon as current starts to flow through its actuating coil because it takes a finite time for the current through the coil to build up to the level necessary to actuate the relay and, after that level of current is reached, it takes a finite time for the relay contacts to close mechanically. On the other hand, a Schmitt trigger circuit into which the actuatable means may be connected has a hysteresis gap, the effect of which can, within certain limits be mitigated by suitably controlling the effective regenerative electrical time constant of the circuit. It is the effective regenerative time constant of the trigger circuit that controls the length of time required for the circuit to be triggered from one state to another state. It is governed by passive linear elements (such as resistors, inductors and capacitors) shunted by and/or in series with, the impedances of non-linear passive and active elements such as diodes and transistors, respectively. Thus, if the effective time constant of the trigger circuit is made to be substantially shorter than the finite combined mechanical and electrical time constant of the actuatable means connected in the circuit, then for a given limit of a hysteresis gap, the trigger circuit is capable of responding to a noise input signal without affecting the actuatable means. In other words, a relatively short noise signal may cause the trigger circuit to change from its first state to its second state and back to its first state in a time that is less than the finite combined mechanical and electrical time constant of the actuatable means.

The invention will be better understood by reference to the following description of one embodiment thereof, taken in conjunction with the accompanying drawing, in which.

Although the embodiment of the invention to be described utilizes a pair of PNP transistors, it is to be understood that other types of transistors may be used by making appropriate changes in certain circuit elements, as is well known to and within the capabilities of one skilled in the art. Furthermore, the invention contemplates that vacuum tubes might be utilized instead of semiconducting devices, although for most applications of the invention transistors are preferred because of their reliability, small size and weight, and low power requirements.

Figure 1:
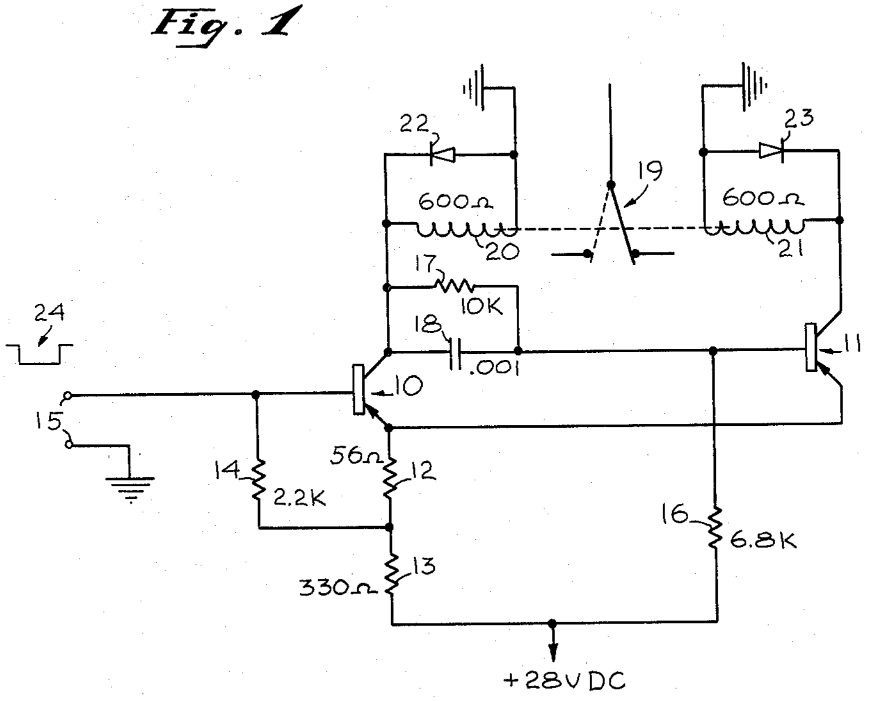
FIG. 1 is a schematic diagram of one embodiment of the invention.

The embodiment of the invention shown in FIG. 1 is an improved Schmitt trigger circuit comprising two PNP transistors 10 and 11, whose emitter electrodes are both connected through series resistors 12 and 13 to a conventional source of direct voltage (not shown). The base electrode of the transistor 10 is connected through a resistor 14 to the juncture of the resistors 12 and 13 in order to provide a biasing voltage on the base electrode, which is also connected to one of a pair of input terminals 15, the other of which is grounded.

The base electrode of the transistor 11 is connected to the source of direct voltage through a resistor 16 and is also connected to the collector electrode of the transistor 10 through a regenerative coupling circuit comprising a resistor 17 and capacitor 18 connected in parallel.

Electrically actuatable means are connected in the output circuits of the transistors 10 and 11. In the present case, the actuatable means comprises a relay, indicated generally by the numeral 19, having actuating coils 20 and 21 connected between the collector electrodes of transistors 10 and 11, respectively, and ground. The relay coils 20 and 21 are shunted by diodes 22 and 23, respectively, to absorb any inductive surge which appears when the relay coils are deenergized.

The relay 19 is of the latching type, whereby when current flows through the collector-emitter circuit of the transistor 11, the coil 21 is energized to hold the relay in the position shown in the figure. When the transistor 11 is not conducting and the transistor 10 is conducting, the coil 21 is deenergized while the coil 20 is energized to hold the relay contact in the position shown by the broken line. Thus, the relay contacts are positively held in either of their two positions. In this manner, actuation of the relay because of vibration or shock is substantially eliminated.

In the normal or quiescent state of the circuit shown in FIG. 1, with no input pulse being applied to the base of the transistor 10, the transistor 10 is not conductive and the transistor 11 is conductive. This condition is assumed initially because, assuming for the moment that the transistor 10 is conductive, the bias placed on its base through the resistor 14, because of the voltage divider comprising resistors 13 and 12 and relay coil 20, causes its base to be positive with respect to its emitter electrode and the transistor will cut itself off. When this happens, the emitter electrode of the transistor 11 will become positive with respect to the base electrode of the transistor, which is connected into the voltage divider comprising resistors 16 and 17 and relay coil 20. Thus, transistor 11 will become conductive and relay coil 21 will be energized. While the relay 11 is conductive, the transistor 10 is maintained nonconductive by the bias on its base electrode.

If now an input pulse, having the general shape shown at 24, is applied to the input terminals 15, and is of sufficient negative amplitude to overcome the positive bias on the base electrode of the transistor 10, the transistor 10 will start to conduct. When it conducts, the voltage at its collector electrode rises because of the increased voltage drop across the relay coil 20, and this rise is coupled through the capacitor 18 to the base of the transistor 11. Raising the potential at the base of the transistor 11 results in reducing the current flow through that transistor, which results in raising the potential at the emitter electrode of the transistor 10 because of the reduced voltage drop across the resistors 12 and 13. This, in turn, increases the current flowing through the transistor 10, which again raises the potential of the base electrode of the transistor 11. This regenerative effect quickly forces the transistor 10 into saturation while cutting off the transistor 11. Thus, current flow through the relay coil 21 ceases while current now flows through the relay coil 20, thereby changing the state of the relay contacts to that shown by the broken line.

If now the input signal ceases, the base electrode of the transistor 10 is again biased to a voltage more positive than its emitter electrode thus tending to cut off conduction through the transistor 10 and cause the voltage at its collector electrode to fall. This decrease in voltage is coupled through the capacitor 18 to the base of the transistor 11 causing that transistor to start conduction. Through the regenerative effect previously described, the transistor 10 will be rapidly cut off thus deenergizing the relay coil 20, while the transistor 11 becomes fully conductive and the relay coil 21 is energized to return the relay to its original position.

As was previously mentioned, the actuatable means, in this case the relay 19, has a finite combined mechanical and electrical time constant. This is caused by the fact that a finite time is required for current to build up through the inductive coils 20 and 21 of the relay to a sufficient value to cause the contacts of the relay to change their position. In addition, a finite time is required for the contacts to change from one position to another after the current through the actuating coil is sufficiently high to cause such a change. Normally, the combined mechanical and electrical time constant of the relay is much shorter than the duration of the input signal which triggers the circuit in which the relay is connected so that the time constant is of no particular importance. However, if the circuit is subjected to bursts of noise, which might well occur if the input terminals 15 are connected to the output of a radio or telemeter receiver, the relative time constants of the relay and the regenerative portion of the trigger circuit become of extreme importance, because of the hysteresis of the circuit. If the noise bursts or signals are very short, no particular difficulty may be experienced. On the other hand, if the length of the noise burst approaches the time constant of the relay, it may well cause the relay to be actuated, which is obviously undesirable.

Figure 2:
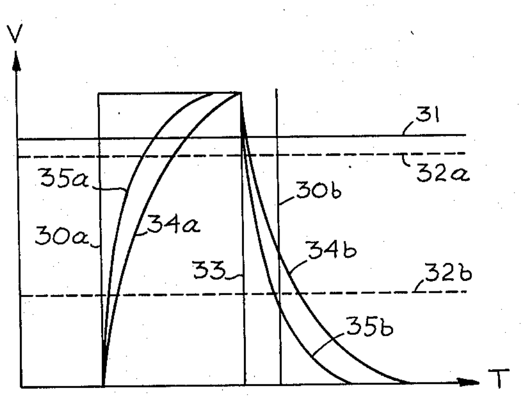
FIG. 2 is a timing diagram useful in understanding the operation of the circuit of the invention.

FIG. 2 is a diagram which illustrates the importance of the various time constants involved in the improved trigger circuit of the invention. As shown in that figure, a relay has a finite combined mechanical and electrical time constant, which is shown as an interval extending between lines 30*a* and 30*b*. For purposes of explanation, it is assumed that an input signal must have an amplitude greater than the level indicated by line 31 in order to trigger the circuit. Once triggered from its first state to its second state, the circuit will remain in its second state until the amplitude of the input signal falls below a level indicated by broken line 32*a*. When operating the circuit at normal or high temperatures, it has been found that it may exhibit little or no hysteresis and so the line 32*a* may lie close to or coincidental with the line 31. However, when the circuit is operated at extremely low temperatures, the circuit exhibits substantial hysteresis, such that the signal level required to return the circuit from its second state to its first state may drop to a very low level, as is indicated by a broken line 32b. It is because of this phenomenon that the relative time constants of the circuit and the relay become important.

The effective electrical regenerative time constant of a circuit such as shown in FIG. 1 represents the length of time it takes the circuit to switch from one state to the other when the circuit is triggered by a square wave input signal applied thereto. The effective time constant causes the signal across the reactive load elements (the relay coils) to no longer be a square wave, but to have sloping leading and trailing edges. In the following discussion, the term "apparent signal level" is used to indicate the signal apparent across the relay coils.

Assume now that the circuit is subjected to a burst of noise at its input whose duration is indicated by the distance between lines 30a and 33, and that the noise burst is of sufficient amplitude to trigger the circuit. When this occurs, the regenerative action of the circuit starts and follows an effective time constant indicated by line 34a. It is assumed that the noise burst lasts long enough to permit the regenerative action to be completed before the burst ends at line 33. At the end of the burst, the restoring regenerative action occurs and follows a time constant indicated by line 34b. As seen in FIG. 2, the relay has not been actuated by the end of the burst (at line 33) because its time constant extending between the lines 30a and 30b is longer than the time duration of the noise burst extending between the lines 30a and 33. If the circuit is operating at a normal or elevated temperature where there is little or no hysteresis, the relay will not be actuated after the end of the burst because the effective regenerative time constant 34b permits the apparent signal level to drop below the level indicated by line 32a before actuation of the relay can occur. If, however, the circuit is being operated at a very low temperature where it has substantial hysteresis, so that the signal level must fall to the level indicated by the line 32b before the circuit switches back to its first state, the relay would be actuated. This occurs because the effective time constant 34b has not permitted the apparent signal level to fall below the line 32b before the relay actuating time indicated by the line 30b. Therefore, for reliable operation under such low temperature conditions, the effective time constant of the trigger circuit is adjusted to a value such as indicated by the curves 35a and 35b. If the effective time constant is so adjusted, it is seen that the apparent signal level will have fallen below the line 32b before the relay can be actuated. Of course, if the duration of the noise burst is approximately equal to or longer than the time constant of the relay, the relay will be actuated regardless of the effective time constant of the regenerative portion of the trigger circuit. It is particularly pointed out that the effective time constant of the regenerative portion of this circuit cannot be adjusted to too short a value or the proper regenerative action will not be obtained for the circuit to operate properly; in other words, the time constant must have a finite value greater than zero.

In the preferred form of the invention, the effective time constant of the regenerative portion of the trigger circuit is selected to be substantially less than the combined electrical and mechanical time constant of the relay or other actuatable means connected in the circuit. It is pointed out that the relay may have two different combined electrical and mechanical time constants, one when switching from one condition to the second condition and a different time constant when switching back to the first condition. The effective regenerative time constant of the circuit should be substantially shorter than the shortest relay time constant. Thus, the circuit may respond to a noise signal input by changing from its first state to its second state and back again to its first state upon cessation of the noise signal, all before the relay has had time to change its condition.

The value of the effective regenerative time constant of the trigger circuit may be adjusted in various ways. However, the most expedient method is to vary the value of the capacitor 18 in the coupling circuit that connects the collector electrode of the transistor 10 to the base electrode of the transistor 11, thus varying the time constant of that particular regenerative circuit. Circuit element values and voltages have been indicated for the specific circuit shown in FIG. 1. Those values, in that particular circuit, provide optimum operation under both high and low temperature environmental conditions. However, it is pointed out that those values are in no way limiting and, because of the extreme complexity of computing the effective regenerative time constant of the circuit, circuit element values must in many cases be determined empirically.

Although a specific embodiment of the invention has been shown and described, it is apparent that many changes and modifications may be made by one skilled in the art without departing from the true spirit and scope of the invention.

What is claimed is:

1. In a trigger circuit having an effective electrical time constant, a pair of transistors with one of said transistors being normally conductive and the other normally non-conductive in the absence of an input signal, electrically actuatable means connected in an output circuit of one of said transistors, said actuatable means having a finite combined mechanical and electrical time constant, and means for applying said input signal to one of said transistors for causing said normally conductive transistor to become non-conductive only for the duration of said input signal, the improvement comprising a regenerative circuit connected between said two transistors and having a time constant value to cause said effective electrical time constant of said trigger circuit to be substantially shorter than said time constant of said actuatable means.

2. In a trigger circuit having an effective electrical time constant, a pair of transistors with one of said transistors being normally conductive and the other normally non-conductive in the absence of an input signal, electrically actuatable means connected in an output circuit of said normally conductive transistor, said actuatable means having a finite combined mechanical and electrical time constant, and means for applying said input signal to said normally non-conductive transistor for causing said normally conductive transistor to become non-conductive only for the duration of said input signal, the improvement comprising a regenerative circuit connected between said two transistors and having a time constant value to cause said effective electrical time constant of said trigger circuit to be substantially shorter than said time constant of said actuatable means.

3. The circuit defined by claim 2, wherein said regenerative circuit comprises resistor means and capacitor means connected in parallel.

4. A transistorized relay trigger circuit having an effective electrical time constant and comprising first and second transistors each having base, collector and emitter electrodes, a relay having an actuating coil connected in a collector-emitter circuit of one of said transistors, said relay having a finite combined mechanical and electrical switching time after said coil is energized, means biasing said first transistor to a normally non-conducting state, means interconnecting the collector-emitter circuits of said first and second transistors to bias said second transistor to a normally conducting state when said first transistor is non-conducting, means for applying an input signal to said first transistor to overcome said biasing and make said first transistor conductive and said second transistor non-conductive only for the duration of said input signal, and regenerative means connecting the collector-emitter circuit of said first transistor to the base electrode of said second transistor and having a time constant value to cause said effective electrical time constant of said trigger circuit to be substantially shorter than said relay switching time.

5. A transistorized relay trigger circuit having an effective electrical time constant and comprising first and second transistors each having base, collector and emitter electrodes, a relay having an actuating coil connected in a collector-emitter circuit of said second transistor, said relay having a finite combined mechanical and electrical switching time after said coil is energized, means biasing said first transistor to a normally non-conducting state, means interconnecting the collector-emitter circuits of said first and second transistors to bias said second transistor to a normally conducting state when said first transistor is non-conducting, means for applying an input signal to said first transistor to overcome said biasing and make said first transistor conductive and said second transistor non-conductive only for the duration of said input signal, and regenerative means connecting the collector-emitter circuit of said first transistor to the base electrode of said second transistor and having a time constant value to cause said effective electrical time constant of said trigger circuit to be substantially shorter than said relay switching time.

6. A transistorized relay trigger circuit having an effective electrical time constant and comprising first and second transistors each having base, collector and emitter electrodes, a relay having first and second actuating coils respectively connected in collector-emitter circuits of said first and second transistors, said relay having a finite combined mechanical and electrical switching time after one or the other of said coils is energized, means biasing said first transistor to a normally non-conducting state, means interconnecting the collector-emitter circuits of said first and second transistors to bias said second transistor to a normally conducting state when said first transistor is non-conducting, means for applying an input signal to said first transistor to overcome said biasing and make said first transistor conductive and said second transistor non-conducting only for the duration of said input signal, and means connecting the collector-emitter circuit of said first transistor to the base electrode of said second transistor and having a time constant value to cause said effective electrical time constant of said trigger circuit to be substantially shorter than said relay switching time.

7. A transistorized relay trigger circuit having an effective electrical time constant and comprising first and second transistor each having base, collector and emitter electrodes, a relay having first and second actuating coils respectively connected in collector-emitter circuits of said first and second transistors, said relay having a finite combined mechanical and electrical switching time after one or the other of said coils is energized, means biasing said first transistor to a normally non-conducting state, means interconnecting the collector-emitter circuits of said first and second transistors to bias said second transistor to a normally conducting state when said first transistor is non-conducting, means for connecting an input signal to said first transistor to overcome said biasing and make said first transistor conductive and said second transistor non-conductive only for the duration of said input signal, and resistor means and capacitor means connected in parallel between the collector-emitter circuit of said first transistor and the base electrode of said second transistor and having a time constant value to cause said effective electrical time constant of said trigger circuit to be substantially shorter than said relay switching time.

8. In a trigger circuit adapted to be changed from a first state to a second state for the duration of an input signal and having electrically actuatable means connected in said circuit to be energized when said circuit is in one of said states, said actuatable means having a finite combined mechanical and electrical time constant, regenerative means connected in said circuit to cause said circuit to tend to return to said first state upon cessation of said input signal, said regenerative means having an effective electrical time constant greater than zero but substantially shorter than said finite combined mechanical and electrical time constant, whereby a noise input signal causes said circuit to change from first state to said second state and back to said first state in a time less than said finite combined mechanical and electrical time constant.

9. In a trigger circuit adapted to change from a first state to a second state for the duration of an input signal and having two electrically actuatable means connected in said circuit to be energized when said circuit is in said first and second states, respectively, said actuatable means respectively having finite combined mechanical and electrical time constants, regenerative means connected in said circuit to cause said circuit to tend to return to said first state upon cessation of said input signal, said regenerative means having an effective electrical time constant greater than zero but substantially shorter than any one of said finite combined mechanical and electrical time constants, whereby a noise input signal causes said circuit to change from said first state to said second state and back to said first state in a time less than any one of said finite combined mechanical and electrical constants.

10. A transistorized relay trigger circuit for use under severe environmental conditions and having an effective electrical time constant, the circuit comprising:

first and second transistors each having base, collector and emitter electrodes, a relay having an actuating coil connected in a collector-emitter circuit of one of said transistors, said relay having a finite combined mechanical and electrical switching time after said coil is energized, means biasing said first transistor to a normally non-conducting state, means interconnecting the collector-emitter circuits of said first and second transistors to bias said second transistor to a normally conducting state when said first transistor is non-conducting, means for applying a pulse input signal and conditionally applying a noise input signal to said first transistor to overcome said biasing and make said first transistor conductive and said second transistor non-conductive only for the durations of said input signals, said pulse input signal having a duration greater than said relay switching time and said noise input signal having a duration less than said relay switching time, and regenerative means connecting the collector-emitter circuit of said first transistor to the base electrode of said second transistor and having a time constant value to cause said effective electrical time constant of said trigger circuit to be substantially shorter than said relay switching time and said pulse input signal duration, whereby said noise input signal causes the first transistor to become conductive and then non-conductive in a time less than said relay switching time.

11. A transistorized relay trigger circuit for use under severe environmental conditions and having an effective electrical time constant, the circuit comprising:

first and second transistors each having base, collector and emitter electrodes, a relay having first and second actuating coils respectively connected in collector-emitter circuits of said first and second transistors, said relay having a finite combined mechanical and electrical switching time after one or the other of said coils is energized, means biasing said first transistor to a normally non-conducting state, means interconnecting the collector-emitter circuits of said first and second transistors to bias said second transistor to a normally conducting state when said first transistor is non-conducting, means for applying a pulse input signal and conditionally applying a noise input signal to said first transistor to overcome said biasing and make said first transistor conductive and said second transistor non-conductive only for the durations of said input signals, said pulse input signal having a duration greater than said relay switching time and said noise input signal having a duration less than said relay switching time, and resistor means and capacitor means connected in parallel between the collector-emitter circuit of said first transistor and the base electrode of said second transistor and having a time constant value to cause said effective electrical time constant of said trigger circuit to be substantially shorter than said relay switching time and said pulse input signal duration, whereby said noise input signal causes said first transistor to become conductive and then non-conductive in a time less than said relay switching time.

References Cited by the Examiner

UNITED STATES PATENTS

| | | | |
|---|---|---|---|
| 2,806,153 | 9/57 | Walker | 307—88.5 |
| 2,848,658 | 8/58 | Mitchell | 317—148.5 |
| 2,995,668 | 8/61 | Sharaf | 307—88.5 |
| 3,111,608 | 11/63 | Boenning et al. | 317—148.5 |

OTHER REFERENCES

General Electric Transistor Manual, fifth edition, Oct. 28, 1960; page 122.

SAMUEL BERNSTEIN, *Primary Examiner.*